June 9, 1925.
S. B. WINN
1,541,457
SYSTEM OF TRANSPORTATION
Filed July 2, 1923    4 Sheets-Sheet 1
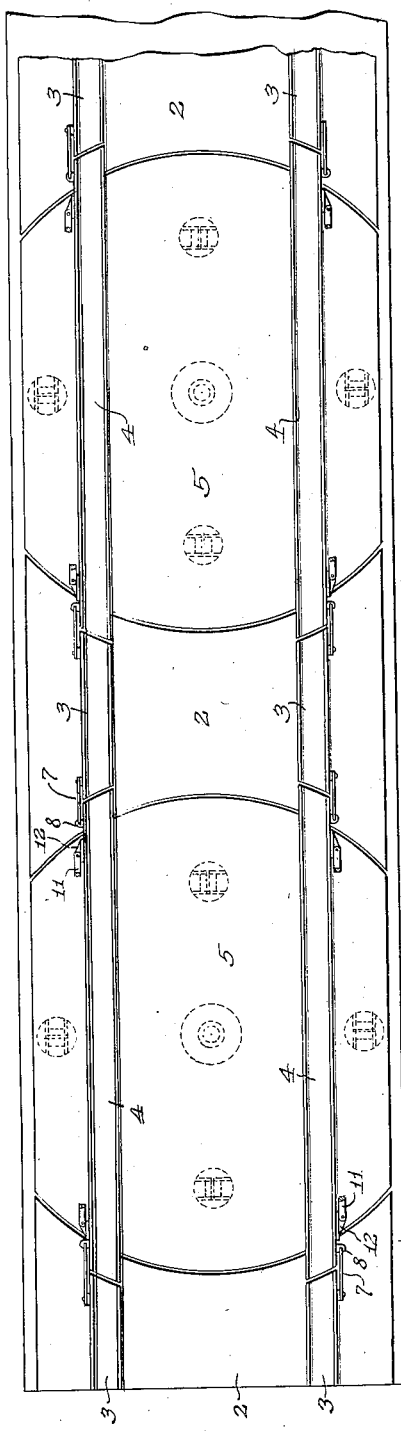
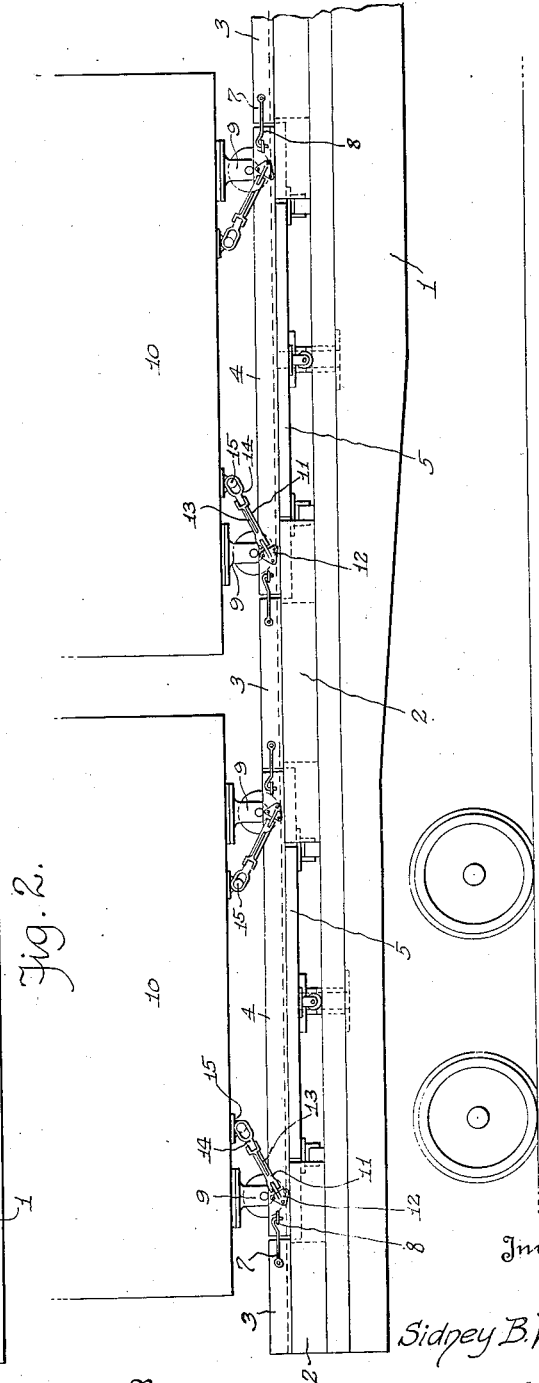
Inventor
Sidney B. Winn,
By
Attorney

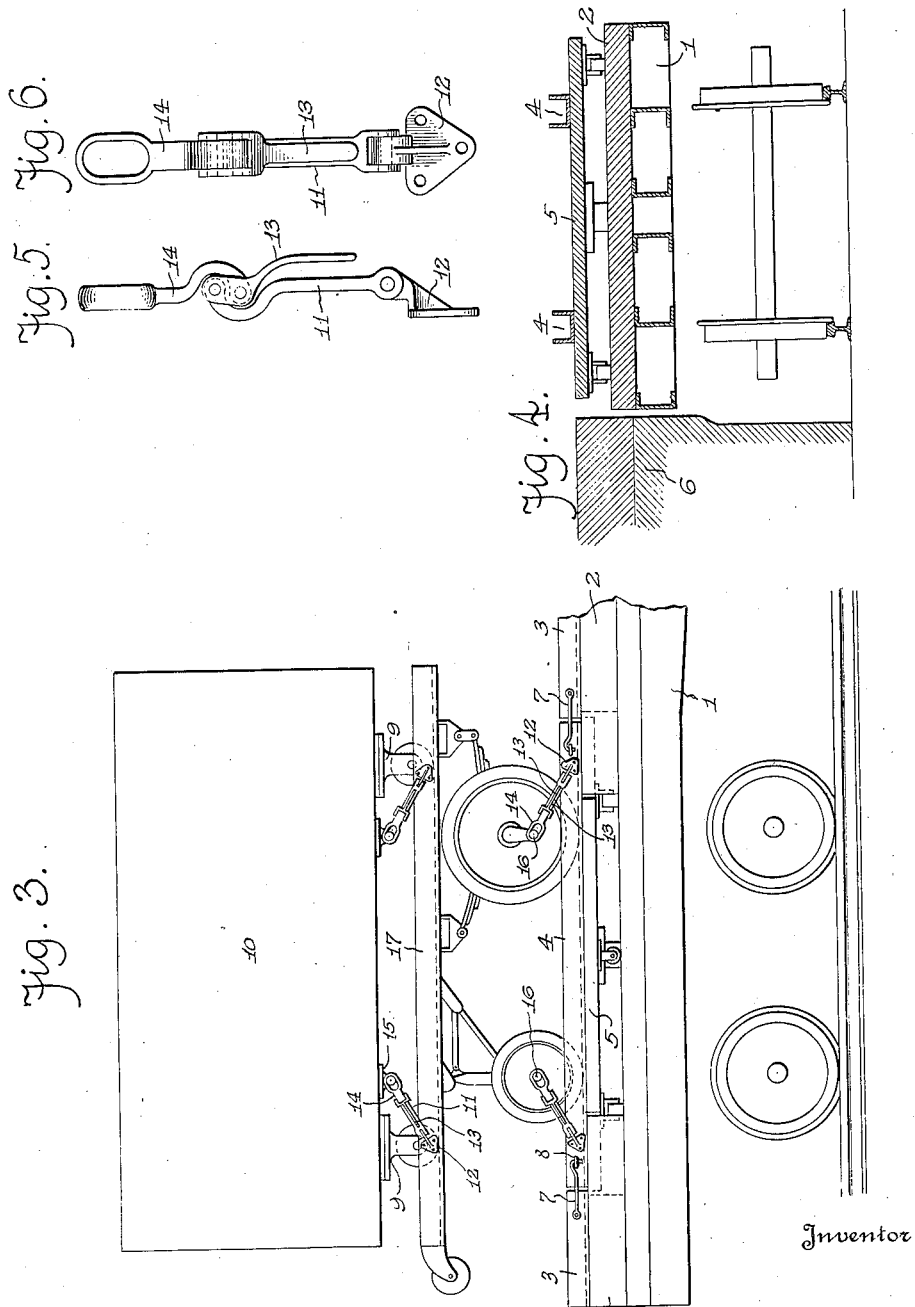

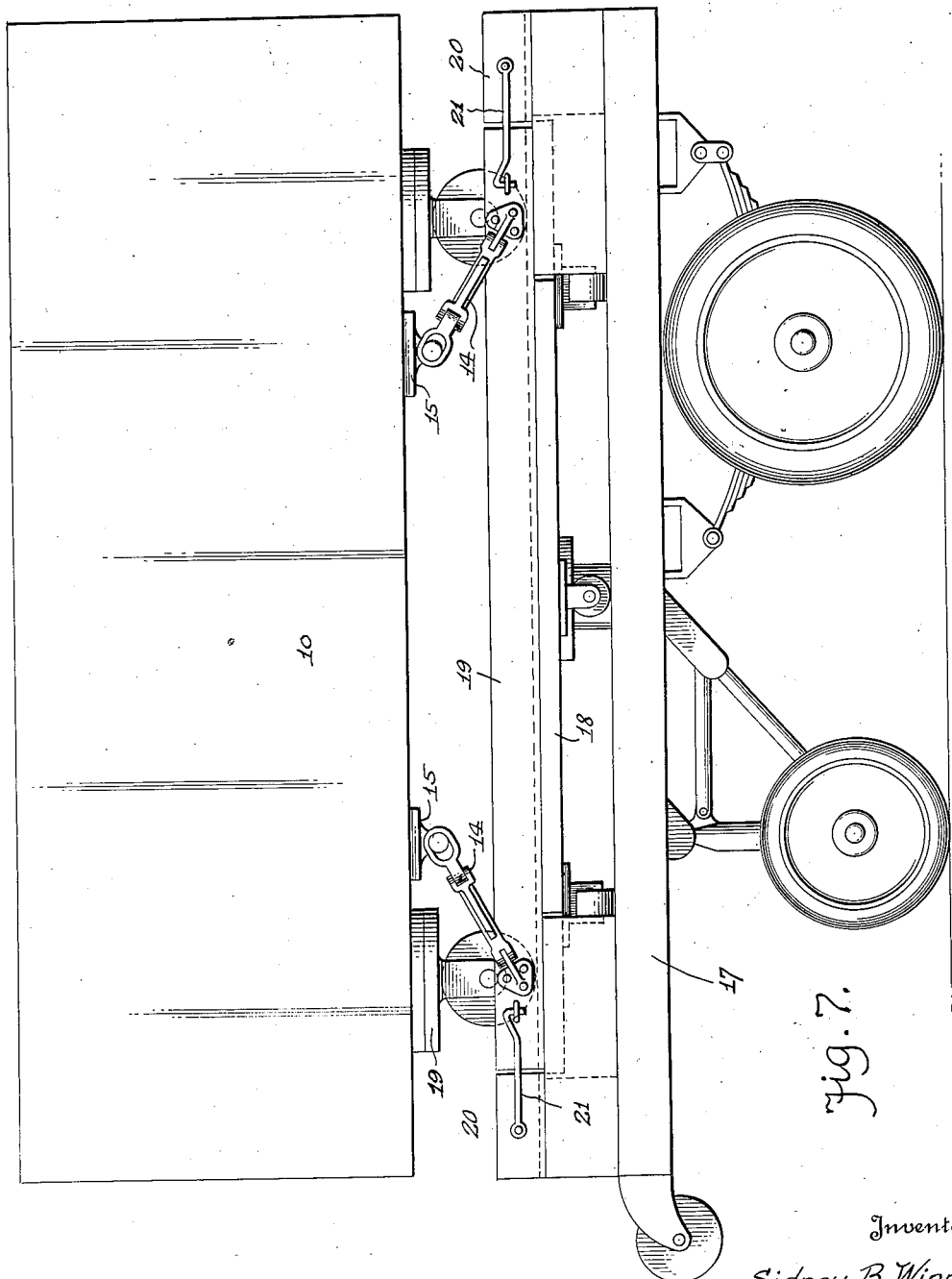

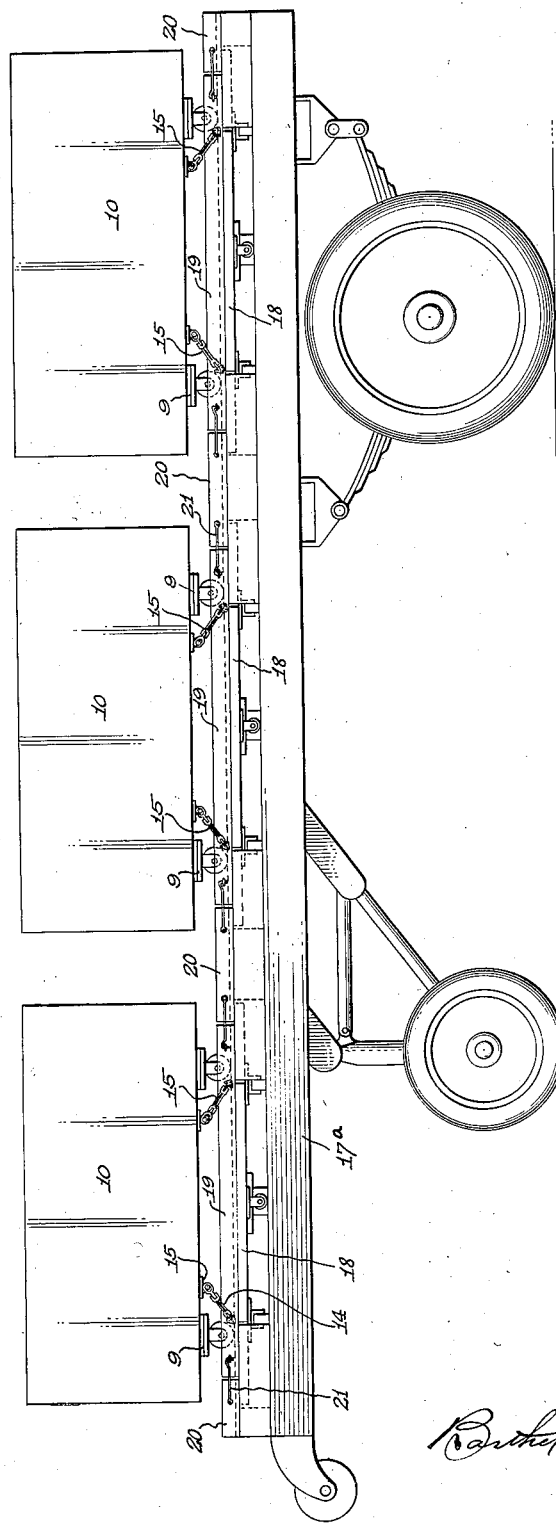

Patented June 9, 1925.

1,541,457

UNITED STATES PATENT OFFICE.

SIDNEY B. WINN, OF LAPEER, MICHIGAN.

SYSTEM OF TRANSPORTATION.

Application filed July 2, 1923. Serial No. 648,964.

*To all whom it may concern:*

Be it known that I, SIDNEY B. WINN, a citizen of the United States of America, residing at Lapeer, in the county of Lapeer and State of Michigan, have invented certain new and useful Improvements in Systems of Transportation, of which the following is a specification, reference being had therein to the accompanying drawings.

This invention relates to a system of transportation, and has reference to the handling of merchandise in bulk, for instance, small parcels that may be placed in a container adapted for carrying the parcels from a consignor to one or more consignees. It is in this connection that my system may be advantageously used for the parcel post where a container may be loaded at a postoffice and bodily transported to the beginning of a route, where the container could be opened and the parcels delivered through the route. Furthermore, heavy freight which ordinarily requires a derrick, crane, hoist or some special apparatus for loading and unloading the freight may be handled by my system of transportation which in certain instances obviates the necessity of loading platforms or even freight houses. I have in mind crated automobiles and heavy machinery which must be lifted on to a flat bottom car, anchored thereon, and then lifted off of the car, all of which required a special equipment by the consignor and consignee of the freight.

My invention, in its broadest aspect, dispenses with a special loading and unloading apparatus mentioned above, and in lieu thereof I provide a railway car with a track and turn-tables adapted to receive a vehicle or wheeled container. For placing the vehicle on the car, runways or a loading platform may be necessary, but when a wheeled container alone is to be placed on the car, it may be conveyed to the car by a vehicle with or without turn-tables, and transferred direct from the vehicle to the car, this being accomplished without a loading platform or the like and at any place where a vehicle can be placed along a side or at either end of the car. It is through the medium of the car equipment a wheeled container can be shifted on to the car at either side or placed on the car from either end. With the turn tables alining with the cars a wheeled container can be shifted from one car to another and placed at a desired location in the formation of a train. When a loading platform is convenient, the car is adapted to be placed alongside the platform and the turn-table positioned so that a vehicle or wheeled container can be wheeled off of the platform on to the turntable and then the turn-table shifted to place the vehicle or wheeled container longitudinally of the car. Suitable means are employed for holding the turn-tables of the car against accidental movement during transportation and other means are employed for anchoring the vehicle or wheeled container relative to the car or the wheeled container relative to the vehicle on which it may rest, so that the vehicle and container may be safely transported.

My invention further aims to utilize trailers or other vehicles for supporting wheeled containers or other forms of freight on cars, the trailers permitting of tractors being utilized to place trailers on the cars and remove the same. In lieu of the tractor, vehicles may be used movable by hand or otherwise for placing the containers where desired. In the shipment of merchandise in bulk or as heavy freight it may be placed in a wheeled container and wheeled on to a trailer, which may be drawn by a tractor on to a loading platform and placed on a car. While the trailer is in transportation the tractor may be used for other purposes, and with a tractor at the destination of the freight, the trailer may be removed by the tractor from the car to an unloading platform, where the wheeled container on the trailer may be backed off of the trailer or otherwise unloaded. To handle any kind of freight it is only necessary to have loading and unloading platforms approximating the height of a railway car or trailer and it is obvious that such freight may be handled more expeditiously, with less labor and at low cost compared to the expensive equipment necessary for raising and lowering heavy freight at the places of shipment and at terminals. In fact, there are many places where my system of transportation, as a whole or in part, may be used with a great saving and it is thought unnecessary to review all the uses in order to realize the advantages that may be gained.

The combination of vehicles by which my system of transportation may be put into practice will be hereinafter described and then claimed, and reference will now be had to the drawings, wherein—

Figure 1 is a side elevation of a portion of a flat bottom railway car provided with turn-tables and showing wheeled containers anchored on the turn-tables;

Fig. 2 is a plan of the railway car;

Fig. 3 is a side elevation of a portion of the railway car provided with a turn-table supporting a trailer or other vehicle on which is anchored a wheeled container;

Fig. 4 is a cross sectional view of the railway car relative to a loading or unloading platform;

Figs. 5 and 6 are detail views of a convenient form of anchoring device that may be employed as hold-down means for the vehicle or containers;

Fig. 7 is a side elevation of a trailer provided with a turn table supporting a wheeled container, and Fig. 8 is a similar view of a trailer having a plurality of turn tables.

In the drawings, the reference numeral 1 denotes a flat bottom railway car and built into the car or mounted thereon is a runway 2 provided with longitudinal parallel channel rails 3 affording a track which includes turn-table rails 4 on turn-tables 5 arranged in the runway 2 and said turn-tables have the rails 4 thereof extending over the runway 2 to aline with the rails 3, as best shown in Fig. 2. The turn-tables 5 can be shifted to place the rails 4 thereof transversely of the car so that the rails 4 may be in proximity to a loading platform 6 approximately on a level therewith to permit of the railway car being loaded from either side thereof. After a load has been placed on either turn-table the turn-table may be swung to longitudinally aline with the car and may be anchored or held by any suitable means. As an example of such means I show the rails 3 provided with hooks 7 engaging eyes 8 of the turn-table rails 4. When a car is loaded from either end, the turn-tables may be secured in alinement so that a load may be shifted from one position to another, for instance, from one car to another and thus placed at a desired point in a train formation, without the necessity of shifting a train in order that each car may be loaded.

The turn-table rails 4 are adapted to receive the wheels or trucks 9 of a container 10 and this container is of such a form that it may receive merchandise in bulk and the container closed and sealed by the consignor so that the merchandise may be safely transported to the consignee. I have already referred to its use for parcel post purposes. The container 10 may represent a large crate or box provided with the wheels or trucks 9 simply for transportation purposes and as such it is adapted to be wheeled from the platform 6 on to a turn-table or on to any other part of a car and anchored on the turn-table or car. For this purpose I provide each turn-table with hold-down means to prevent accidental shifting of the wheeled container because of the weaving of the car 1 under service conditions. The hold-down means may be in the form of members 11 pivotally connected to brackets 12 attached to the sides of each turn-table and the pivoted members 11 have pivoted levers 13 supporting link members 14 which may be placed over brackets 15 carried by the wheeled container 10. The levers 13 have the toggle action which will draw the members 11 and 14 together and anchor the wheeled container 10 relative to the turn table, or car.

Instead of wheeling the container 10 on to a turn-table, I may place the wheeled container 10 on a trailer or vehicle 17 equipped with the hold-down means so that the wheeled container may be anchored on the trailer or vehicle 17 against accidental displacement while the wheeled container is being transported from a factory loading platform to a railway yard loading platform or to the side or end of a car. The trailer or vehicle 17 may be of that type disclosed in any one of my patents on a tractor trailer combination, for instance, Patent No. 1,316,660 dated September 23, 1919. The trailer is adapted to be moved by a tractor or by hand and while the trailer is being loaded or unloaded the tractor may be used for other purposes.

Then again, the trailer 17 may be provided with one or more turn-tables 18 having rails 19 adapted to aline with rails 20 and be held in such alinement by hooks 21. Such a trailer may obviate the necessity of a loading platform for the reason that the trailer can be placed at the side or end of the railway car and the wheeled container transferred direct from the turn-table 18 of the trailer to the turn-table 5 of the railway car. One or more turn-tables on a trailer will also facilitate the loading and unloading of other merchandise, as shown in Fig. 8 in which the trailer is indicated at $17^a$.

If the wheeled container 10 is to be shipped independent of a trailer 17, devoid of a turn table, the container may be wheeled off of the trailer 17 on to a loading platform and then on to a turn-table of the railway car, or the trailer 17 may be backed up alongside of the car and the wheeled container shifted from the trailer direct on to the car platform.

In some instances, the freight or containers may be loaded on the trailer 17 and the trailer loaded on to the car turn-table, as shown in Fig. 3, in which instance the hold-down means of the car turn-table is connected to the axles 16 of the trailer or some other part thereof to prevent the trailer from shifting during transportation. It is obvious that when the car arrives at its destination that a tractor may be connected to the trailer, the trailer removed from the car to the place of unloading the freight and the freight easily removed from the trailer or distributed from the wheeled container throughout a route traversed by the trailer. It is also obvious that the wheeled container can be unloaded while the trailer and container remain on the railway car.

Throughout this method of transportation I obviate the necessity of using cranes or hoisting devices, prevent injury to the freight by such devices, and save labor, time, and expense incident to loading and unloading under such conditions. In providing wheeled containers, freight may be shipped on flat cars, less expensive than box cars, and a merchant or manufacturer may pack and seal the merchandise or goods with the assurance that it will reach its destination in such form; eliminating considerable handling and way billing by the railroad, and thus avoiding delays, expensive draying and charges incurred thereby.

While I have, for the purpose of describing and illustrating, my invention, and method, shown a specified form of trailer and hold-down device, it will be understood that my invention is not so limited, but on the contrary is generic to the broad idea of at all time laterally moving freight, from the time it starts its journey until it reaches its destination such being in contradistinction to vertically moving, as by lifting, at certain stages of the journey.

What I claim is:—

1. As a means for transporting commodities, etc., a traveling carrier having a trackway extending longitudinally of the carrier, said trackway being adapted to permit travel of wheeled carriers and containers thereover and including a plurality of individual turntables symmetrically disposed on the carrier and adapted to carry a portion of said trackway, said turn-tables being spaced apart relative to each other and arranged to provide the conditions of a continuous trackway or a trackway broken by movement of a turn-table, and co-operating means carried by the stationary and turn-table portions of the car to maintain the trackway in its alined condition, whereby the trackway may contain a plurality of wheeled carriers or containers with the loading and unloading of the carriers or containers provided with the turn-tables in position to aline the trackway or with the continuity of the trackway broken to permit the carriers or containers to be moved to and from position on the travelling carrier in a regular succession or in an irregular order.

2. Means as in claim 1 characterized in that the spacing of the turn-tables is such as to permit the loading or unloading of any of the wheeled carriers or containers without disturbing the positions of adjacent carriers or containers.

3. Means as in claim 1 characterized by anchoring means operative to anchor the wheeled carriers or containers relative to the turntables, to retain the wheeled carriers or containers in definite and fixed position relative to the traveling carrier during transportation.

4. Means as in claim 1 characterized by anchoring means operative to anchor the wheeled containers or carriers relative to the turn-tables to retain the wheeled carriers or containers in definite and fixed position relative to the travelling carrier during transportation, said anchoring means having a connection with the turntable and the carrier or container carried thereby.

5. In combination, a traveling carrier having a trackway extending longitudinally of the carrier, said trackway being adapted to permit travel of wheeled carriers and containers thereover and including a plurality of individual turntables symmetrically disposed on the travelling carrier and adapted to carry a portion of said trackway, said turntables being spaced apart relative to each other and arranged to provide the conditions of a continuous trackway or a trackway broken by movement of a turntable, co-operating means carried by the stationary and turntable portions of the travelling carrier to maintain the trackway in its alined condition, and a plurality of wheeled containers or carriers adapted to be carried by the travelling carrier, each wheeled carrier or container having wheel base dimensions such as to permit the carrier or container to be supported wholly by the turntable, said turntables permitting loading and unloading of the wheeled carriers or containers in a regular succession with the trackway continuous or in regular or irregular order with a turntable moved to present its trackway portion transverse to the direction of length of the entire trackway.

6. A combination as in claim 5 characterized by means for anchoring the turntables in their track-alined positions, and means for anchoring the wheeled carriers or containers to the turntables.

7. As a means for transporting commodities, etc., a trailer adapted to be moved about by independent motive power, said trailer carrying a trackway with a turntable operative within the trackway to permit loading and unloading of wheeled carriers or containers upon the trailer by movement of the carriers or containers in the direction of length of the trackway or angularly thereto, said trailer having a wheel base formation dimensioned in such way as to permit travel of the laden trailer on and in contact with a roadway or to be loaded upon and carried by a railway car, whereby said trailer and the wheeled carrier or container carried thereby form a transportable unit capable of bodily movement over a roadway or as the load of a railway car or a selective use of both forms of travel to permit unit maintenance during transfer of the commodity carrier or containers from place to place.

8. Means as in claim 7 characterized in that the unit formation is maintained by anchoring means to maintain the position of the turntable and by anchoring means for maintaining the wheeled carrier or container in fixed position on the trailer.

In testimony whereof I affix my signature in the presence of two witnesses.

SIDNEY B. WINN.

Witnesses:
KARL H. BUTLER,
ANNA M. DORR.